United States Patent
Derouault

(10) Patent No.: US 9,487,200 B2
(45) Date of Patent: Nov. 8, 2016

(54) COMBINED SERVICE BRAKE CYLINDER AND SPRING BRAKE CYLINDER HAVING A BAYONET COUPLING

(71) Applicant: KNORR-BREMSE Systeme fuer Nutzfahrzeuge GmbH, Munich (DE)

(72) Inventor: Sylvain Derouault, Hermival les Vaux (FR)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 399 days.

(21) Appl. No.: 14/245,395

(22) Filed: Apr. 4, 2014

(65) Prior Publication Data

US 2014/0305121 A1 Oct. 16, 2014

Related U.S. Application Data

(63) Continuation of application No. PCT/EP2012/069371, filed on Oct. 1, 2012.

(30) Foreign Application Priority Data

Oct. 7, 2011 (DE) .................. 10 2011 115 122

(51) Int. Cl.
*F01B 7/00* (2006.01)
*B60T 11/236* (2006.01)
*B60T 17/08* (2006.01)

(52) U.S. Cl.
CPC ........... *B60T 11/236* (2013.01); *B60T 17/083* (2013.01); *Y10T 29/49826* (2015.01)

(58) Field of Classification Search
CPC .................................................. B60T 17/083
USPC ............................................ 92/62, 63, 98 R
See application file for complete search history.

(56) References Cited

U.S. PATENT DOCUMENTS 3,217,611 A * 11/1965 Leighton ............... B60T 17/083
92/63
4,887,513 A * 12/1989 Ewald ................... B60T 17/083
92/63

(Continued)

FOREIGN PATENT DOCUMENTS

DE 35 36 767 A1 4/1987
DE 40 11 739 A1 10/1991
(Continued)

OTHER PUBLICATIONS

Chinese-language Office Action issued in counterpart Chinese Application No. 201280057323.3 dated Sep. 2, 2015 with English translation (Nine (9) pages).

(Continued)

*Primary Examiner* — Michael Leslie
(74) *Attorney, Agent, or Firm* — Crowell & Moring LLP

(57) ABSTRACT

A combined service brake cylinder and spring brake cylinder for brake systems of vehicles is provided, wherein a bayonet coupling is configured between the spring brake cylinder and an intermediate wall. The bayonet coupling has locking segments protruding radially outward on an end-side edge of a wall of the spring brake cylinder and recess segments formed radially inward and recess segments corresponding thereto that are formed radially outward and formed on an annular chamber connected to the intermediate wall and locking segments protruding radially inward into the annular chamber. A bottom-side stop surface in the annular chamber forms an axial stop for the end-side wall edge of the spring brake cylinder. An annular seal is arranged between a circumferential surface of the edge of the wall of the spring brake cylinder pointing radially inward and the circumferential surface of the annular chamber pointing radially outward. A recess provided in the bottom of the annular chamber accommodates at least one end section of the annular seal, and end-face contact surfaces are provided on the locking segments of the spring brake cylinder for abutting on the bottom-side stop surface in the annular chamber. At least the and section of the annular seal is clamped between the recess in the bottom of the annular chamber and the edge of the wall of the spring brake cylinder.

8 Claims, 3 Drawing Sheets

(56) References Cited

U.S. PATENT DOCUMENTS

| | | | |
|---|---|---|---|
| 5,315,918 A | 5/1994 | Pierce | |
| 6,405,635 B1 * | 6/2002 | Smith | B60T 17/083 92/98 R |
| 6,526,867 B2 * | 3/2003 | Anderson | B60T 17/085 92/98 R |
| 7,963,210 B2 * | 6/2011 | Lanquetot | B60T 17/086 92/63 |

FOREIGN PATENT DOCUMENTS

| | | |
|---|---|---|
| DE | 41 35 943 A1 | 5/1993 |
| DE | 10 2006 005 031 A1 | 8/2007 |
| WO | WO 2010/066378 A1 | 6/2010 |

OTHER PUBLICATIONS

International Preliminary Report on Patentability (PCT/IB/373), dated Apr. 8, 2014, including Written Opinion (PCT/ISA/237) (Six (6) pages).
International Search Report with English translation dated Feb. 13, 2013 (6 pages).

* cited by examiner

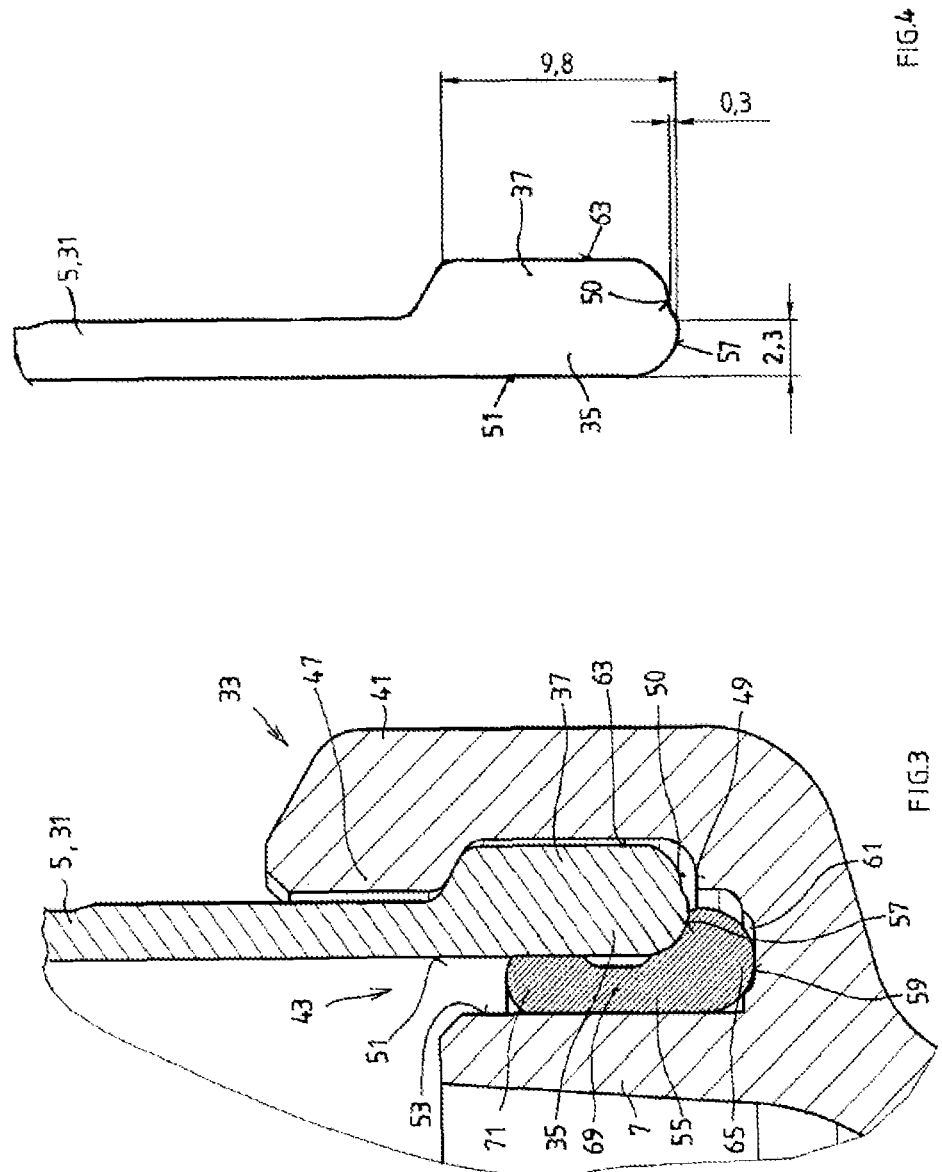

COMBINED SERVICE BRAKE CYLINDER AND SPRING BRAKE CYLINDER HAVING A BAYONET COUPLING

BACKGROUND AND SUMMARY OF THE INVENTION

The invention relates to a combined service brake and spring brake cylinder for brake systems of vehicles.

A generic combined service brake and spring brake cylinder is known for example from DE 40 11 739 A1, wherein the bayonet coupling between the spring brake cylinder and the intermediate wall comprises a separate bayonet ring which, by way of its radially inwardly pointing bayonet segments, engages over both locking elements of the spring brake cylinder and also locking segments of the intermediate wall. Here, an annular seal is arranged between the radially inner circumferential surface of the end-side edge, which has the locking elements, of the spring brake cylinder and a radially inner circumferential surface of the annular chamber, which annular seal seals off the pressure chamber, which can be aerated and deaerated, with respect to the environment. In this case, the annular seal is held in a groove on the radially inner circumferential surface of the annular chamber.

By contrast, it is the object of the invention to further develop a combined service brake and spring brake cylinder of the type mentioned in the introduction such that it ensures improved sealing of the pressure chamber of the spring brake cylinder.

The object is achieved by providing A combined service brake and spring brake cylinder (1) for brake systems of vehicles, in particular utility vehicles, having a) a service brake piston or service brake diaphragm which is arranged in the service brake cylinder and which can be actuated by a pressure medium and which is operatively connected to a service brake piston rod, the latter projecting out of the service brake cylinder and acting on brake actuation elements, b) a spring brake piston which is arranged in the spring brake cylinder and which can be actuated by an accumulator spring and which is delimited on one side by a pressure chamber and on the opposite side by a spring chamber that accommodates the accumulator spring, wherein the accumulator spring is supported at one side on the spring brake piston and at the other side on the base of the spring brake cylinder, c) an intermediate wall between the service brake cylinder and the spring brake cylinder, which intermediate wall is extended through by a spring brake piston rod which is connected to the spring brake piston, d) a bayonet coupling between the spring brake cylinder and the intermediate wall, which bayonet coupling has, on an end-side edge of the wall of the spring brake cylinder, radially outwardly projecting locking elements and radially inwardly molded recess segments and has, formed correspondingly to these on an annular chamber which is connected to the intermediate wall, radially outwardly molded recess segments and locking segments which project radially inward into the annular chamber, e) a base-side abutment surface in the annular chamber as an axial abutment for the end-side edge of the wall of the spring brake cylinder, f) an annular seal which is arranged between the radially inwardly pointing circumferential surface of the edge of the wall of the spring brake cylinder and the radially outwardly pointing circumferential surface of the annular chamber, characterized in that g) a recess is provided in the base of the annular chamber for the purpose of receiving at least one end section of the annular seal, and h) face-side contact surfaces are provided on the locking segments of the spring brake cylinder for the purpose of abutting against the base-side abutment surface in the annular chamber, wherein i) at least the end section of the annular seal is clamped between the recess in the base of the annular chamber and the edge of the wall of the spring brake cylinder.

The object is also achieved by providing a method for producing a combined service brake and spring brake cylinder of said type.

It is proposed that a recess be provided in the base of the annular chamber for the purpose of receiving at least one end section of the annular seal, and that face-side contact surfaces be provided on the locking segments of the spring brake cylinder for the purpose of abutting against the base-side abutment surface in the annular chamber, wherein at least the end section of the annular seal is clamped between the recess in the base of the annular chamber and the edge of the wall of the spring brake cylinder.

The method for producing the combined service brake and spring brake cylinder then comprises at least the following steps:

a) positioning the annular seal on the radially inwardly pointing circumferential surface of the annular chamber and positioning the end section of the annular seal in the recess in the base of the annular chamber, b) inserting the end-side edge of the wall of the spring brake cylinder by translational movement into the annular chamber of the intermediate wall, with the locking segments being inserted into the corresponding recess segments, until the face-side contact surfaces of the locking segments of the spring brake cylinder come into contact with the associated base-side abutment surface of the annular chamber, with at least the end section of the annular seal being clamped between the recess in the base of the annular chamber and the end-side edge of the wall of the spring brake cylinder, c) rotating the spring brake cylinder and intermediate wall relative to one another such that the radially outwardly projecting locking elements of the spring brake cylinder engage in positively locking fashion behind the radially inwardly projecting locking elements of the intermediate wall within the annular chamber.

The recess in the base of the annular chamber permits centering of the annular seal in a defined position before the spring brake cylinder and intermediate wall are joined together. Said centering assists in achieving that the annular seal is not displaced out of its defined position as a result of the translational insertion of the edge of the wall of the spring brake cylinder during the locking of the bayonet coupling.

Furthermore, the abutment of the face-side contact surfaces on the locking segments of the spring brake cylinder against the abutment surface on the base of the annular chamber assists in achieving that the annular seal is not squeezed to an excessive extent, and thus damaged, during the translational insertion of the edge of the wall of the spring brake cylinder. A defined available space for the end section of the annular seal is thus predefined.

It is not least the case that the clamping of the annular seal defined by contact surfaces and abutment surface ensures a certain degree of compression of the annular seal, and thus improved sealing behavior.

It is particularly preferable if the contact surfaces of the locking segments of the spring brake cylinder extend over the entire segment arc and, being formed as axial recesses in a face surface of the edge of the wall of the spring brake cylinder, have a spacing of 0.1 to 0.3 mm from said face surface. Said recesses, which are of small dimensions in the axial direction and on which the contact surfaces are formed, prevent the edge of the wall from protruding to an excessively great extent into the annular chamber and thus prevent excessive clamping of and damage to the annular seal.

It is furthermore preferable if the contact surfaces of the locking segments of the spring brake cylinder, measured with a spacing of 2.1 mm to 2.3 mm from the radially inwardly pointing circumferential surface of the edge of the wall of the spring brake cylinder, extend to the radially outwardly pointing circumferential surface of the locking segments.

It is preferable here if the base-side abutment surface in the annular chamber for the contact surfaces of the locking segments of the spring brake cylinder is arranged radially to the outside of the recess in the base of the annular chamber for the annular seal.

It is particularly preferable if the annular chamber is formed integrally with the intermediate wall. It is then possible to dispense with the production of a bayonet ring as in DE 40 11 739 A1, which simplifies the production of the combined service brake and spring brake cylinder.

In one refinement, the annular seal is of bone-like form in cross section, with end sections of bead-like form and with a central section narrowed in relation to said end sections. The other end section of the annular seal is then clamped elastically in the radial direction between a radially inwardly pointing circumferential surface of the edge of the wall of the spring brake cylinder and a radially outwardly pointing circumferential surface of the annular chamber of the intermediate wall. This ensures a sealing action and a force fit which prevents release of the bayonet coupling.

BRIEF DESCRIPTION OF THE DRAWINGS

The invention will be presented by way of example below on the basis of the drawings, in which:

FIG. 3 is a cross-sectional illustration of the bayonet coupling; and

FIG. 4 is a cross-sectional illustration of an edge of the wall of the spring brake cylinder with locking segments of the bayonet coupling.

DESCRIPTION OF THE EXEMPLARY EMBODIMENT

Figure 1:
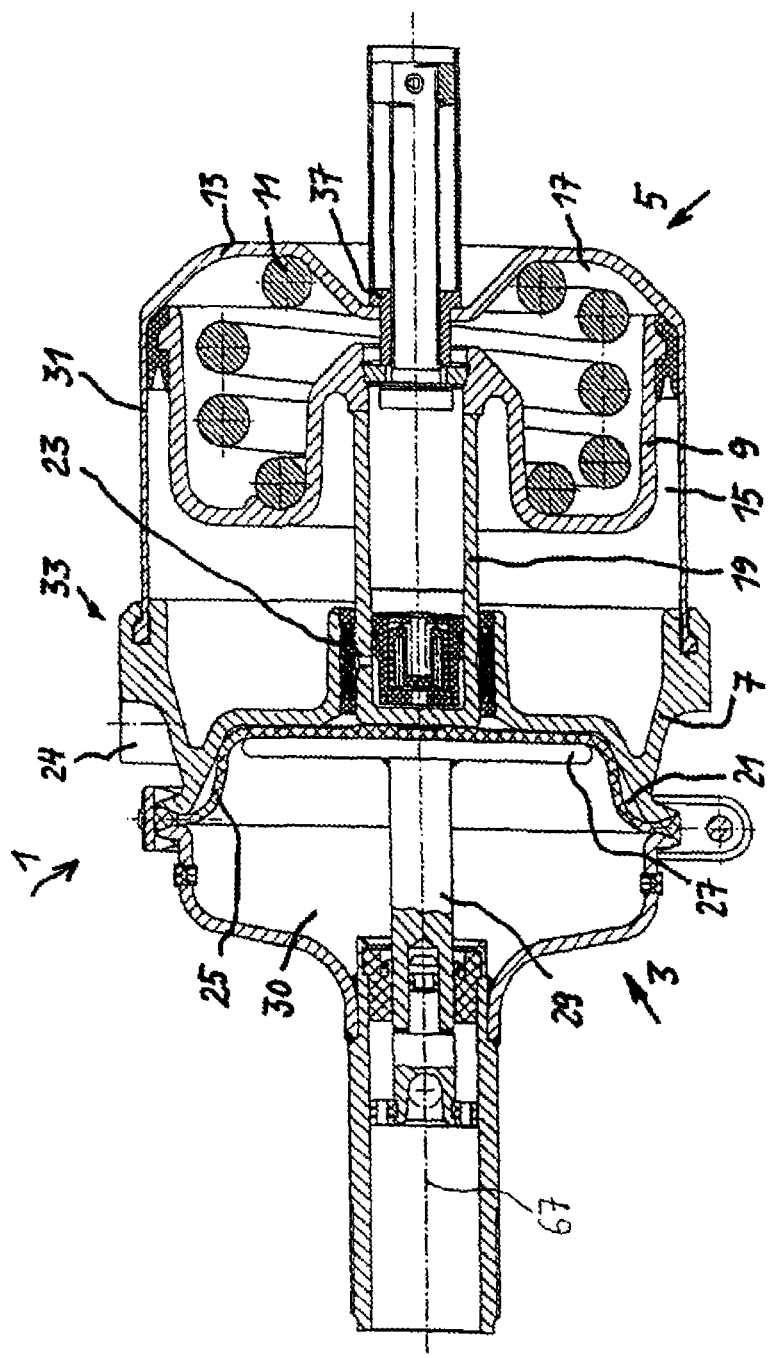
FIG. 1 is a cross-sectional illustration of a combined service brake and spring brake cylinder according to a preferred embodiment.

In the following description of the exemplary embodiments, identical or functionally identical components and assemblies are denoted by the same reference signs.

For the explanation of the invention by way of an example, FIG. 1 of the drawing illustrates a combined service brake and spring brake cylinder, referred to hereinafter as combination cylinder 1. The combination cylinder 1 is composed of a service brake cylinder 3 and of a spring brake cylinder 5 connected structurally and functionally to said service brake cylinder; the service brake cylinder and the spring brake cylinder are separated from one another by an intermediate wall 7. A piston 9 is displaceably arranged within the spring brake cylinder, wherein an accumulator spring 11 bears against one side of the piston 9. At its opposite side, the accumulator spring 11 is supported against the base 13 of the spring brake cylinder 5.

Into the pressure chamber 15 situated to the left of the piston 9 in FIG. 1 there issues an inlet (not illustrated) through which compressed air is introduced in order to displace the piston 9 to the right, so as to compress the accumulator spring 11. During said displacement of the piston, the air that is situated within the spring chamber 17 that accommodates the accumulator spring is pushed out, for example via a check valve (not illustrated). If, by contrast, for braking purposes, the pressure in the pressure chamber 15 of the spring brake cylinder is released upon the actuation of a valve, such as is known per se, connected to the inlet of the pressure chamber, then the accumulator spring 11 can displace the piston 9 to the left in the illustration in FIG. 1.

The piston 9 is connected to a piston rod 19 which extends through the intermediate wall 7 into the region of the pressure chamber 21 of the service brake cylinder 3. A seal 23 located in the intermediate wall seals against the outer wall of the piston rod during the longitudinal movements of the latter. Into the pressure chamber 21 there issues an inlet 24 via which compressed air is admitted for the actuation of the service brake cylinder. The compressed air acts on the diaphragm 25 located within the service brake cylinder 3, on the opposite side of which diaphragm there is provided a thrust piece in the form of a diaphragm plate 27. The diaphragm plate 27 is connected to a thrust rod 29 which extends out of the chamber 30, situated to the left of the diaphragm 25, of the service brake cylinder and interacts (in a way which is not illustrated) with a brake actuating mechanism outside the combination cylinder 1. Said brake actuating mechanism may for example refer to the actuating parts of a disk brake of a motor vehicle. The wall 31 of the spring brake cylinder 5 is preferably composed of steel or aluminum.

Figure 2:
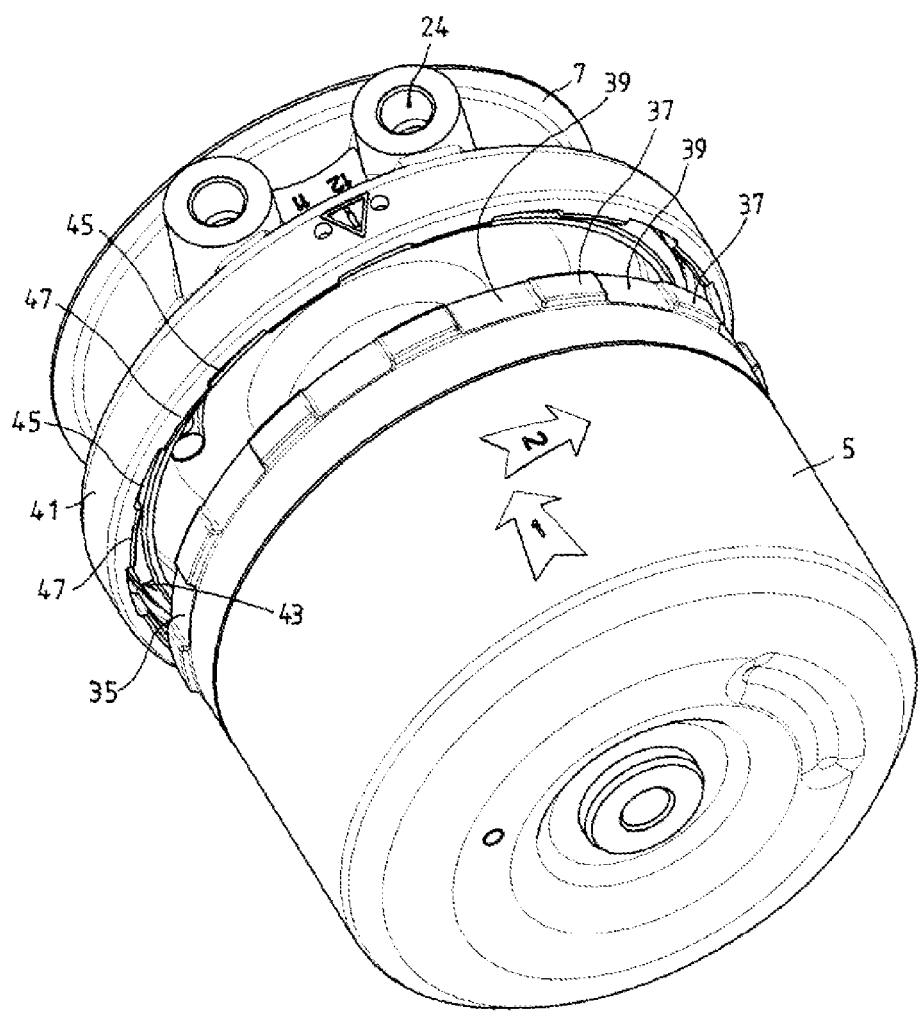
FIG. 2 is a perspective illustration of the combined service brake and spring brake cylinder of FIG. 1 during the assembly of a bayonet coupling.

For the releasable connection of the spring brake cylinder 5 to the intermediate wall 7, a bayonet coupling 33 is provided which is shown in FIG. 2 and FIG. 3. The bayonet coupling 33 has, on an end-side edge 35 of the wall 31 of the spring brake cylinder 5, radially outwardly projecting locking segments 37 and radially inwardly molded recess segments 39 and has, formed correspondingly to these on an annular chamber 43 which is formed on the end-side edge 41 of the intermediate wall 7, radially outwardly molded recess segments 45 and locking segments 47 which project radially inward into the annular chamber 43. It is preferable here for locking segments 37, 47 and recess segments 39, 45 to alternate over the circumference in each case without gaps and to each have the same segment arc length. The locking segments 37 and the recess segments 39 of the spring brake cylinder 5 are preferably arranged directly on the end-side edge 35 of the wall 31, and in the same way, the locking segments 47 and the recess segments 45 of the intermediate wall 7 are arranged directly on the edge 41 thereof.

Furthermore, a base-side abutment surface 49 in the annular chamber 43 acts as an axial abutment for contact surfaces 50 of the locking segments 37 on the end-side edge 35 of the wall 31 of the spring brake cylinder 5 when said edge 35 is inserted by translational movement into the annular chamber 35, as will be described in more detail further below.

For sealing off the pressure chamber 15 with respect to the environment, an annular seal 55 is provided which is arranged between the radially inwardly pointing circumferential surface 51 of the edge 35 of the wall 31 of the spring brake cylinder 5 and the radially outwardly pointing circumferential surface 53 of the annular chamber 43, as can be seen in particular in FIG. 3. The annular seal 55 is in particular in the form of a cylindrical ring section.

It is particularly preferable for the annular chamber 43 to be formed integrally with the edge 41 of the intermediate wall 7 and to be in the form of an annular notch, on the face side in the axial direction, in the end-side edge 41, which points towards the edge 35 of the wall 31 of the spring brake cylinder 5, of the intermediate wall 7. On the base 59 of the annular chamber 43 there is formed a radially inner, annular recess 61. Here, the base-side abutment surface 49 in the annular chamber 43 is arranged radially to the outside of the recess 61 in the base 59 of the annular chamber 43 for the annular seal 55.

As can be seen in particular from FIG. 4, the contact surfaces 50 of the locking segments 37 of the spring brake cylinder 5 extend in each case over the entire segment arc length thereof and, being formed as axial recesses in a face surface 57 of the edge 35 of the wall 31 of the spring brake cylinder 5, have a spacing of 0.1 to 0.3 mm (0.3 mm by way of example in FIG. 4) from said face surface. Furthermore, the contact surfaces 50 of the locking segments 37 of the spring brake cylinder 5, measured with a spacing of 2.1 mm to 2.3 mm (2.3 mm by way of example in FIG. 4) from the radially inwardly pointing circumferential surface 51 of the edge 35 of the wall 31 of the spring brake cylinder 5, extend to the radially outwardly pointing circumferential surface 63 of the locking segments 37. It is provided not least that the length of the locking segments as seen in the axial direction is approximately 9.8 mm. In a further embodiment (not shown here), the face surface 57 of the edge 35 of the wall 31 does not have a recess, and then itself forms the contact surface 50 by way of a radially outer section.

The annular seal 55 has a bone-shaped form in cross section, with end sections 65 and 71 of bead-like form and with a central section 69 narrowed in relation to said end sections.

Against this background, proceeding from the initial state shown in FIG. 2 in which the intermediate wall 7 is oriented coaxially with the spring brake cylinder 5, the bayonet coupling 33 is locked or closed as follows: firstly, the annular seal 55 is positioned on the radially inwardly pointing circumferential surface 53 of the annular chamber 43, and in particular, the end section 65 of said annular seal is positioned in the recess 61 in the base 59 of the annular chamber 43. For this purpose, the annular seal 55 or the end section 65 thereof is provided with a corresponding inner diameter. The end-side edge 35 of the wall 31 of the spring brake cylinder 5 is then inserted by translational movement into the annular chamber 43 of the intermediate wall 7, as indicated in FIG. 2 by the arrow 1.

In the process, the locking segments 37 of the spring brake cylinder 5 are inserted into the corresponding recess segments 45 of the intermediate wall, and the locking segments 47 of the intermediate wall 7 are inserted into the corresponding recess segments 39 of the spring brake cylinder 5, by translational movement, that is to say coaxially with the central axis 67 of the combination cylinder 1, until the face-side contact surfaces 50 of the locking segments 37 of the spring brake cylinder 5 come into contact with the associated base-side abutment surface 49 of the annular chamber 43. In the process, the end section 65 of the annular seal 55 is clamped axially between the recess 61 in the base 59 of the annular chamber 43 and the face surface 57 of the end-side edge 35 of the wall 31 of the spring brake cylinder 5. Here, however, for the end section 65 of the annular seal 55, an axial space remains between the recess 61 in the base 59 of the annular chamber 43 and the face surface 57 of the end-side edge 35 of the wall 31 of the spring brake cylinder 5 which is sufficient to prevent said end section from being displaced out of the desired position shown in FIG. 3 or damaged.

On the other hand, however, the other end section 71, which points away from the base 59 of the annular chamber 43, of the annular seal 55 is in the process compressed elastically in the radial direction and clamped between the radially inwardly pointing circumferential surface 51 of the edge 35 of the wall 31 of the spring brake cylinder 5 and the radially outwardly pointing circumferential surface 53 of the annular chamber 43 of the intermediate wall 7.

Finally, as per the arrow 2 in FIG. 2, the spring brake cylinder 5 and intermediate wall 7 are rotated relative to one another such that the radially outwardly projecting locking segments 37 of the spring brake cylinder 5 engage in positively locking fashion behind the radially inwardly projecting locking segments 47 of the intermediate wall 7 within the annular chamber 43. In the process, or subsequently, the edge 37 of the spring brake cylinder deflects out of the annular chamber 43 slightly in the axial direction owing to the elastic spring forces of the axially clamped and compressed end section 65 of the annular seal 55, such that, in the locked state of the bayonet coupling 33, the contact surfaces 50 of the locking segments 37 of the spring brake cylinder 5 are spaced apart axially slightly from the abutment surface 49 on the base 59 of the annular chamber 43, and the positive locking action between the locking segments 37, 47 can be generated and/or maintained. The bayonet coupling 33 thus remains in a stressed state. Furthermore, unlocking of the bayonet coupling is prevented by means of two securing pins (not shown here). Said state is shown in FIG. 3. The bayonet coupling 33 is thus locked.

The elastic compression of the annular seal 55 in the radial direction between the radially inwardly pointing circumferential surface 51 of the edge 35 of the wall 31 of the spring brake cylinder 5 and the radially outwardly pointing circumferential surface 53 of the annular chamber 43 of the intermediate wall 7 serves on the other hand to generate a sealing action and a force fit which prevents a release of the bayonet coupling 33, as is easily conceivable from FIG. 3.

LIST OF REFERENCE NUMERALS

1 Combination cylinder
3 Service brake cylinder
5 Spring brake cylinder
7 Intermediate wall
9 Piston
11 Accumulator spring
13 Base
15 Pressure chamber
17 Spring chamber
19 Piston rod
21 Pressure chamber
23 Seal
24 Inlet
25 Diaphragm 27 Diaphragm plate
29 Thrust rod
30 Chamber
31 Wall
33 Bayonet coupling
35 Edge
37 Locking segments
39 Recess segments
41 Edge
43 Annular chamber
45 Recess segments
47 Locking segments
49 Abutment surface
50 Contact surfaces
51 Circumferential surface
53 Circumferential surface
55 Annular seal
57 Face surface
59 Base
61 Recess
63 Circumferential surface
65 End section
67 Central axis
69 Central section
71 End section

The invention claimed is:

1. A combined service brake and spring brake cylinder for brake systems of vehicles, comprising:
 a) a service brake piston or service brake diaphragm which is arranged in a service brake cylinder and which is actuatable by a pressure medium and which is operatively connected to a service brake piston rod, the service brake piston rod projecting out of the service brake cylinder and acting on brake actuation elements;
 b) a spring brake piston which is arranged in a spring brake cylinder and which is actuatable by an accumulator spring and which is delimited on one side by a pressure chamber and on the opposite side by a spring chamber that accommodates the accumulator spring, wherein the accumulator spring is supported at one side on the spring brake piston and at the other side on a base of the spring brake cylinder;
 c) an intermediate wall between the service brake cylinder and the spring brake cylinder, which intermediate wall is extended through by a spring brake piston rod which is connected to the spring brake piston;
 d) a bayonet coupling between the spring brake cylinder and the intermediate wall, which bayonet coupling has, on an end-side edge of a wall of the spring brake cylinder, radially outwardly projecting locking elements and radially inwardly molded recess segments and has, formed correspondingly to these on an annular chamber which is connected to the intermediate wall, radially outwardly molded recess segments and locking segments which project radially inward into the annular chamber;
 e) a base-side abutment surface in the annular chamber as an axial abutment for the end-side edge of the wall of the spring brake cylinder;
 f) an annular seal which is arranged between a radially inwardly pointing circumferential surface of the edge of the wall of the spring brake cylinder and a radially outwardly pointing circumferential surface of the annular chamber;
 g) a recess provided in a base of the annular chamber for receiving at least one end section of the annular seal; and
 h) face-side contact surfaces provided on the locking segments of the spring brake cylinder for abutting against the base-side abutment surface in the annular chamber, wherein
 i) at least an end section of the annular seal is clamped between the recess in the base of the annular chamber and the edge of the wall of the spring brake cylinder.

2. The combined service brake and spring brake cylinder according to claim 1, wherein the face-side contact surfaces of the locking segments of the spring brake cylinder extend over an entire segment arc and, being formed as axial recesses in a face surface of the end-side edge of the wall of the spring brake cylinder, have a spacing of 0.1 to 0.3 mm from said face surface.

3. The combined service brake and spring brake cylinder according to claim 2, wherein the face-side contact surfaces of the locking segments of the spring brake cylinder, measured with a spacing of 2.1 mm to 2.3 mm from the radially inwardly pointing circumferential surface of the edge of the wall of the spring brake cylinder, extend to the radially outwardly pointing circumferential surface of the locking segments.

4. The combined service brake and spring brake cylinder according to claim 1, wherein the base-side abutment surface in the annular chamber is arranged radially to the outside of the recess in the base of the annular chamber, or adjoins said recess radially to the outside.

5. The combined service brake and spring brake cylinder according to claim 1, wherein the annular chamber is formed integrally with the intermediate wall.

6. The combined service brake and spring brake cylinder according to claim 1, wherein the annular seal has a bone-shaped form in cross section, with end sections of bead-like form and with a central section narrowed in relation to said end sections.

7. The combined service brake and spring brake cylinder according to claim 6, wherein another of the end sections of the annular seal is clamped elastically in the radial direction between the radially inwardly pointing circumferential surface of the edge of the wall of the spring brake cylinder and the radially outwardly pointing circumferential surface of the annular chamber of the intermediate wall.

8. A method for producing a combined service brake and spring brake cylinder, the method comprising the steps of:
 a) positioning an annular seal on a radially inwardly pointing circumferential surface of an annular chamber of an intermediate wall and positioning an end section of the annular seal in a recess in a base of the annular chamber;
 b) inserting an end-side edge of a wall of a spring brake cylinder by translational movement into the annular chamber of the intermediate wall, with locking segments being inserted into the corresponding recess segments, until face-side contact surfaces of the locking segments of the spring brake cylinder come into contact with an associated base-side abutment surface of the annular chamber, with at least an end section of the annular seal being clamped between the recess in the base of the annular chamber and the end-side edge of the wall of the spring brake cylinder; and
 c) rotating the spring brake cylinder and the intermediate wall relative to one another such that radially outwardly projecting locking elements of the spring brake cylinder engage in positively locking fashion behind radially inwardly projecting locking elements of the intermediate wall within the annular chamber.

* * * * *